(12) United States Patent
Cuthbert et al.

(10) Patent No.: US 9,678,954 B1
(45) Date of Patent: Jun. 13, 2017

(54) TECHNIQUES FOR PROVIDING LEXICON DATA FOR TRANSLATION OF A SINGLE WORD SPEECH INPUT

(71) Applicant: Google Inc., Mountain View, CA (US)

(72) Inventors: Alexander Jay Cuthbert, Oakland, CA (US); Barak Turovsky, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/926,175

(22) Filed: Oct. 29, 2015

(51) Int. Cl.
*G06F 17/27* (2006.01)
*G06F 17/28* (2006.01)
*G10L 15/00* (2013.01)

(52) U.S. Cl.
CPC ........ *G06F 17/289* (2013.01); *G06F 17/2735* (2013.01); *G10L 15/005* (2013.01)

(58) Field of Classification Search
CPC .................................................. G06F 17/289
See application file for complete search history.

(56) References Cited

U.S. PATENT DOCUMENTS

| | | | |
|---|---|---|---|
| 4,914,704 A | | 4/1990 | Cole et al. |
| 5,073,054 A | * | 12/1991 | McDowell ................. B41J 5/10 400/486 |
| 5,295,070 A | * | 3/1994 | Justice ................. G06F 17/2735 342/460 |
| 5,541,837 A | * | 7/1996 | Fushimoto ............ G06F 17/289 704/2 |
| 5,689,616 A | * | 11/1997 | Li .......................... G10L 15/005 704/232 |
| 5,848,389 A | * | 12/1998 | Asano ..................... G10L 15/18 704/239 |
| 5,963,892 A | | 10/1999 | Tanaka et al. |
| 6,085,160 A | * | 7/2000 | D'hoore ................. G09B 19/06 704/2 |

(Continued)

OTHER PUBLICATIONS

"Updated Google Translate App With 'Word Lens' is Now Available in the App Store," iClarified, Jan. 14, 2015, retrieved on Jan. 12, 2017 from the Internet: http://www.iclarified.com/46565/updated-google-translate-app-with-word-lens-in-now-available-in-the-app-store, 13 pages.

(Continued)

*Primary Examiner* — Eric Yen
(74) *Attorney, Agent, or Firm* — Remarck Law Group PLC

(57) ABSTRACT

Computer-implemented techniques can include capturing, by a microphone associated with a computing device having one or more processors, a speech input from a user, the speech input comprising a single word in a source language, and in response to receiving the speech input from the user, performing a plurality of actions. The plurality of actions can include identifying, by the computing device, the source language of the single word and a target language that is associated with the user, obtaining, by the computing device, one or more translated words that are each a potential translation of the single word to the target language, obtaining, by the computing device, lexicon data for the one or more translated words, the lexicon data relating to at least one semantic meaning of the one or more translated words, and displaying, by the computing device, the lexicon data.

20 Claims, 3 Drawing Sheets

(56) References Cited

U.S. PATENT DOCUMENTS

| | | | |
|---|---|---|---|
| 6,188,986 B1* | 2/2001 | Matulich | G10L 15/26 704/275 |
| 6,385,568 B1* | 5/2002 | Brandon | G06F 17/271 704/2 |
| 6,385,586 B1* | 5/2002 | Dietz | G06F 17/289 704/251 |
| 6,393,443 B1* | 5/2002 | Rubin | G06F 17/22 715/236 |
| 6,397,186 B1* | 5/2002 | Bush | G10L 15/26 704/272 |
| 6,615,178 B1* | 9/2003 | Tajima | G06F 17/2705 704/10 |
| 7,107,204 B1* | 9/2006 | Liu | G06F 17/273 704/2 |
| 7,260,529 B1* | 8/2007 | Lengen | G06F 3/16 704/235 |
| 7,539,619 B1* | 5/2009 | Seligman | G06F 17/2755 704/2 |
| 7,725,309 B2 | 5/2010 | Bedworth | |
| 8,239,207 B2 | 8/2012 | Seligman et al. | |
| 8,332,206 B1* | 12/2012 | Sadovsky | G06F 17/2735 704/10 |
| 8,606,577 B1* | 12/2013 | Stewart | G06F 3/167 704/231 |
| 8,731,944 B2 | 5/2014 | Seligman et al. | |
| 8,812,295 B1 | 8/2014 | Swerdlow et al. | |
| 8,914,277 B1* | 12/2014 | Liu | G06F 17/271 704/10 |
| 2001/0029455 A1* | 10/2001 | Chin | G06F 17/273 704/277 |
| 2001/0053969 A1* | 12/2001 | Hogenhout | G06F 17/2881 704/9 |
| 2002/0010590 A1* | 1/2002 | Lee | G06F 17/2872 704/277 |
| 2002/0085688 A1* | 7/2002 | Lambke | H04M 1/6505 379/88.01 |
| 2002/0169592 A1* | 11/2002 | Aityan | G06F 17/289 704/2 |
| 2003/0009342 A1* | 1/2003 | Haley | G06F 17/289 704/276 |
| 2003/0028382 A1* | 2/2003 | Chambers | G10L 15/26 704/275 |
| 2003/0115059 A1* | 6/2003 | Jayaratne | G06F 17/289 704/235 |
| 2003/0236658 A1* | 12/2003 | Yam | G06F 17/2872 704/2 |
| 2004/0102957 A1* | 5/2004 | Levin | G06F 17/2735 704/3 |
| 2005/0035855 A1* | 2/2005 | Sarnowsky | G08C 17/00 340/531 |
| 2005/0038662 A1* | 2/2005 | Sarich | G06F 17/289 704/277 |
| 2005/0075858 A1* | 4/2005 | Pournasseh | G06F 17/289 704/2 |
| 2005/0155017 A1* | 7/2005 | Berstis | G06F 17/289 717/114 |
| 2008/0221862 A1* | 9/2008 | Guo | G06F 17/289 704/2 |
| 2009/0248392 A1* | 10/2009 | Talwar | G06F 17/289 704/3 |
| 2009/0313007 A1* | 12/2009 | Bajaj | G06F 17/289 704/3 |
| 2009/0326911 A1* | 12/2009 | Menezes | G06F 17/2827 704/2 |
| 2010/0070265 A1* | 3/2010 | Nelson | G06F 17/30669 704/8 |
| 2010/0121630 A1* | 5/2010 | Mende | G06F 17/2785 704/7 |
| 2010/0128994 A1* | 5/2010 | Zwolinski | G06F 1/1626 382/229 |
| 2010/0138217 A1* | 6/2010 | Wang | G06F 17/2735 704/10 |
| 2010/0138221 A1* | 6/2010 | Boys | G10L 15/28 704/235 |
| 2012/0036121 A1* | 2/2012 | Jitkoff | G06F 17/30 707/722 |
| 2012/0183221 A1* | 7/2012 | Alasry | G10L 15/06 382/181 |
| 2012/0197629 A1* | 8/2012 | Nakamura | G06F 17/289 704/3 |
| 2013/0103384 A1* | 4/2013 | Hunter | G06F 17/28 704/3 |
| 2013/0144629 A1* | 6/2013 | Johnston | G06F 3/167 704/275 |
| 2013/0173246 A1* | 7/2013 | Leung | G06F 17/289 704/2 |
| 2013/0211814 A1* | 8/2013 | Derks | G06Q 30/02 704/2 |
| 2014/0012563 A1* | 1/2014 | Caskey | G06F 17/30669 704/2 |
| 2014/0180670 A1* | 6/2014 | Osipova | G06F 17/276 704/3 |
| 2014/0278393 A1* | 9/2014 | Ivanov | G10L 15/20 704/233 |
| 2014/0278441 A1* | 9/2014 | Ton | G10L 21/00 704/275 |
| 2014/0288913 A1* | 9/2014 | Shen | G06F 17/289 704/2 |
| 2014/0365200 A1* | 12/2014 | Sagie | G06F 17/289 704/2 |
| 2015/0161115 A1 | 6/2015 | Cuthbert et al. | |
| 2015/0286634 A1* | 10/2015 | Shin | G06F 17/2785 704/2 |
| 2016/0235998 A1* | 8/2016 | Warren | A61B 5/0424 |

OTHER PUBLICATIONS

PCT International Search Report and Written Opinion dated Jan. 25, 2017 for PCT International Application No. PCT/US2016/058366, 12 pages.

Verma, A., A new look for Google Translate and Android, Google Translate Blog, Jan. 12, 2011, retrieved on Aug. 23, 2012 from the Internet: http://googletranslate.blogspot.nl/2011/01/new-look-for-google-translate-for.htm, 2 pages.

* cited by examiner

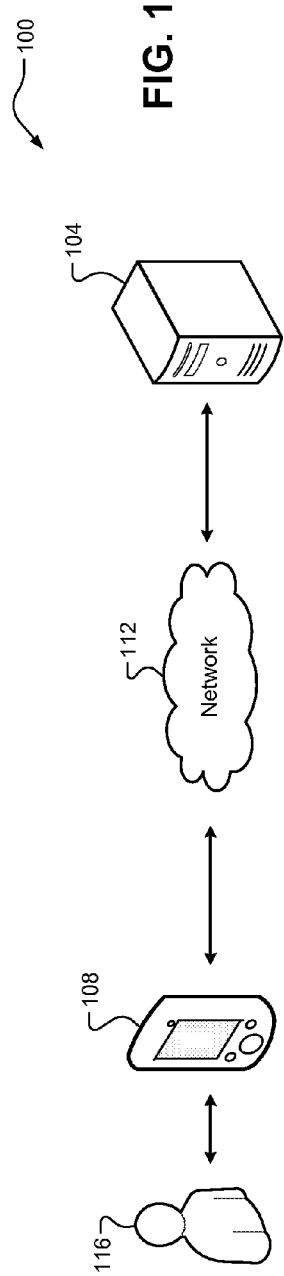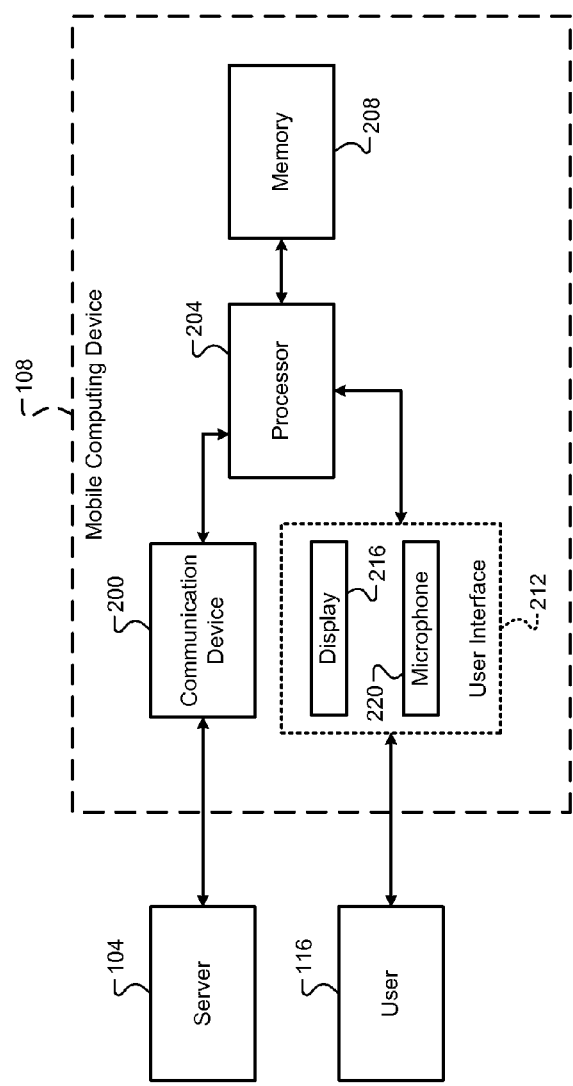

TECHNIQUES FOR PROVIDING LEXICON DATA FOR TRANSLATION OF A SINGLE WORD SPEECH INPUT

FIELD

The present application is generally directed to language translation and, more particularly, to techniques for providing lexicon data for translation of a single word speech input.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Physical input devices (touch displays, physical keyboards, etc.) can differ between mobile computing devices and other (e.g., desktop) computing devices. For example, handheld mobile computing devices, such as tablet computers and mobile phones, can have smaller and/or limited input devices compared to larger desktop or laptop computing devices, which can have larger touch displays and/or full-sized keyboards. These smaller and/or limited input devices can make it more difficult to quickly and efficiently provide a text input (e.g., a search query) to mobile computing devices. Speech input, therefore, is often used as a shortcut to avoid the constant need to use these input devices to provide a text input to mobile computing devices.

SUMMARY

A computer-implemented technique is presented. The technique can include capturing, by a microphone associated with a computing device having one or more processors, a speech input from a user, the speech input comprising a single word in a source language, and in response to receiving the speech input from the user, performing a plurality of actions. The plurality of actions can include identifying, by the computing device, the source language of the single word and a target language that is associated with the user, obtaining, by the computing device, one or more translated words that are each a potential translation of the single word to the target language, obtaining, by the computing device, lexicon data for the one or more translated words, the lexicon data relating to at least one semantic meaning of the one or more translated words, and displaying, by the computing device, the lexicon data.

A computing device and a non-transitory computer-readable medium are also presented. The computing device can include a memory configured to store a set of instructions and one or more processors configured to execute the set of instructions, thereby causing the computing device to perform operations. The computer-readable medium can have the set of instructions stored thereon and, when executed by one or more processors of a computing device, can cause the computing device to perform the operations. The operations can include capturing, by a microphone associated with the computing device, a speech input from a user, the speech input comprising a single word in a source language, and in response to receiving the speech input from the user, performing a plurality of actions. The plurality of actions can include identifying the source language of the single word and a target language that is associated with the user, obtaining one or more translated words that are each a potential translation of the single word to the target language, obtaining lexicon data for the one or more translated words, the lexicon data relating to at least one semantic meaning of the one or more translated words, and displaying the lexicon data.

In some embodiments, the lexicon data comprises at least one of (i) a source language definition of the a particular translated word, (ii) a source language part-of-speech of the particular translated word, (iii) a source language sample sentence that includes the single word, (iv) a target language sample sentence that includes the particular translated word, and (v) another source language word having a similar semantic meaning as the particular translated word. In some embodiments, the lexicon data comprises (i) a source language definition of the a particular translated word, (ii) a source language part-of-speech of the particular translated word, (iii) a source language sample sentence that includes the single word, (iv) a target language sample sentence that includes the particular translated word, and (v) another source language word having a similar semantic meaning as the particular translated word.

In some embodiments, the plurality of actions further include: identifying, by the computing device, one or more applications associated with a particular translated word; and displaying, by the computing device, information associated with the one or more identified applications. In some embodiments, the speech input comprises a plurality of words including the single word and one or more additional words in the source language, and the technique or operations further include: receiving, by a touch-sensitive display of the computing device, a touch input from the user, the touch input specifying the single word from the plurality of words, and in response to receiving the touch input, performing the plurality of actions.

In some embodiments, the source and target languages are two of a plurality of languages associated with the user. In some embodiments, the technique or operations further include receiving, by a touch-sensitive display of the computing device, a touch input from the user, and in response to receiving the touch input from the user, initiating, by the computing device, a listening mode during which the speech input is captured by the microphone.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a diagram of an example computer system according to some implementations of the present disclosure;

FIG. 2 is a functional block diagram of an example mobile computing device of FIG. 1;

DETAILED DESCRIPTION

Figure 3:
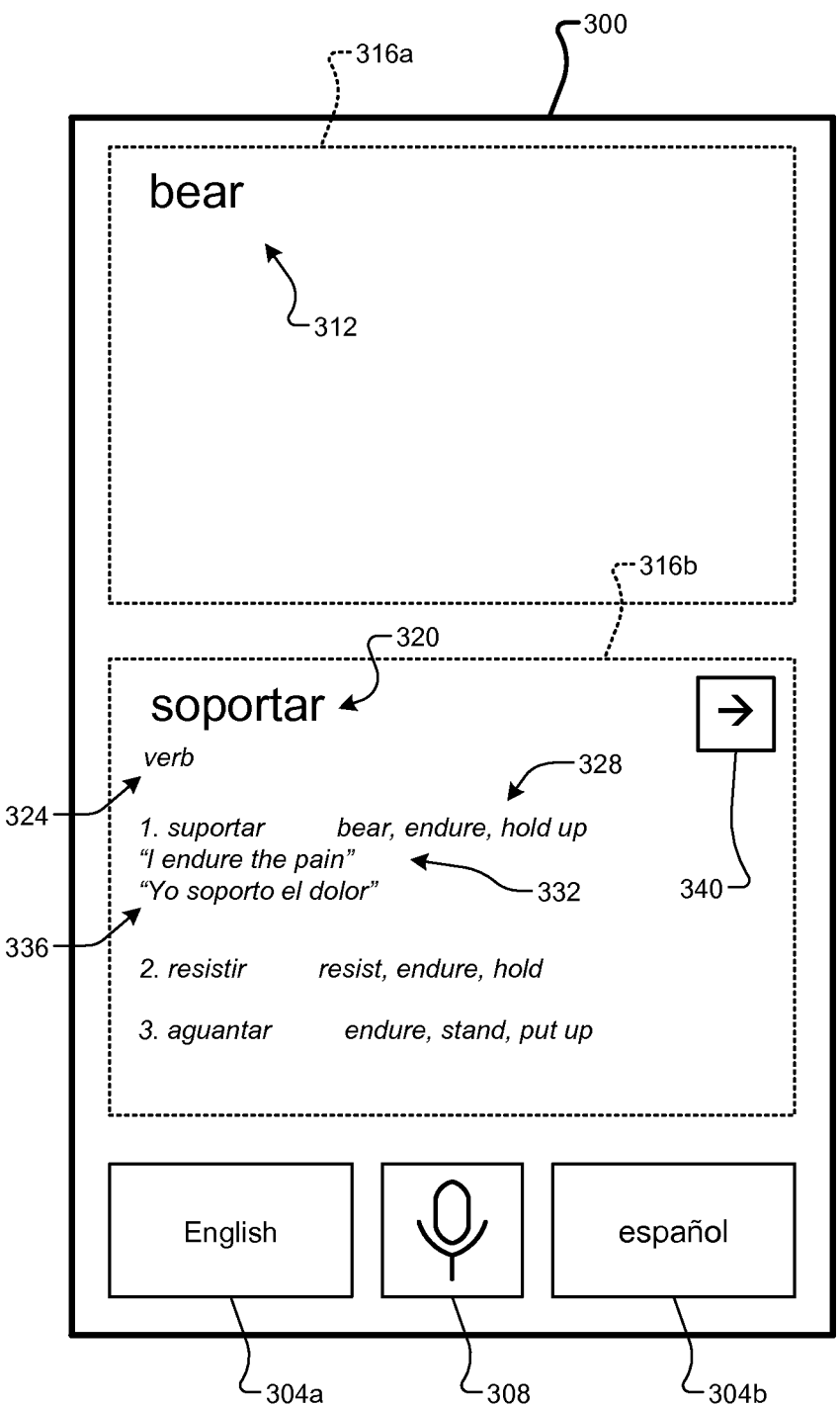
FIG. 3 is a diagram of an example user interface according to some implementations of the present disclosure.

As previously discussed, speech input can be used to avoid slower typing via input devices of mobile computing devices. In language translation, however, the increase in speed of speech input versus typed input can be minimal or negative because of potential errors in speech detection, which can be caused by background noise, dialect, and other similar sources. Moreover, speech input for language translation is typically designed for either (i) conversation, between two or more users (human-to-human or human-to-computer), or rather translation of complete sentences that are spoken to another entity (e.g., question/answer for human-to-computer), or (ii) practicing how to say a phrase or sentence, such as during the process of learning of a new language. Users of mobile computing devices, however, may use speech input to quickly discover the meaning of a word in a specific context. For example, a word in the source language may have a plurality of potential translations or meanings in the target language.

In such a scenario, the speech input is only a portion of the solution. That is, the users may also want quick access to definitions, parts-of-speech, colloquial examples or sample sentences, synonyms, and/or imagery that can help them identify the meaning and appropriate uses for specific meanings. Obtaining this additional information, however, is often a difficult and time consuming process for the users. More particularly, the speech input and translation-specific lexicon resources are typically fragmented and thus the translation-specific lexicon resources are not available for other potential translations as well as alternatives for the transcribed speech input. Rather, only a most-likely speech input and corresponding translation may be available by the translation-specific lexicon resources. In these situations, the users may be required to cut/paste alternative translated word(s) into another application, such as a search application.

Accordingly, techniques are presented for providing lexicon data for translation of a single word speech input. The techniques enable a user to quickly and efficiently obtain lexicon data for a translation of a single word in a source language provided by speech input to a different target language, without any further user interactions. In other words, the techniques function more like a search engine compared to only performing speech-to-text and subsequent translation. The source and target languages may be two of a plurality of languages associated with (e.g., preferred by) the user. The term "lexicon data" as used herein can refer to any information relating to at least one semantic meaning of the one or more translated words. Examples of the lexicon data include definitions, parts-of-speech, example or sample sentences, related words, and representative images. These techniques can leverage a knowledge graph containing relationships between single words and other content (images, addresses/maps, product names, song lyrics, etc.).

By displaying this lexicon data to the user, the user can quickly ascertain the meaning of the translated word, e.g., in a target language that is preferred by or associated with the user. In some implementations, the user can initially provide a plurality of words (e.g., a phrase or a sentence) via speech input, and the user can select one of the plurality of words for translation and lexicon data provision according to the techniques of the present disclosure. For example, the user may select a particular word that they do not know or understand. Other information could also be provided to the user related to the translated word(s), such as contextually-relevant images, links to related websites, and/or a list of related applications or games. These techniques also represent a solution that is rooted in computer technology to overcome a problem specifically arising in the realm of mobile computing devices: enabling users to quickly and efficiently obtain lexicon data for translated speech input without further user interaction. It should also be noted that these techniques could be extended outside of language translation, such as to camera applications or handwriting applications. In these applications, the capture of the image/handwriting could cause the automatic obtaining of related information/content.

Referring now to FIG. 1, a diagram of an example computer system 100 is illustrated. The computer system 100 can include an example server 104 and an example mobile computing device 108 according to some implementations of the present disclosure. The term "server" as used herein can refer to a single computer or a plurality of computers operating in a parallel or distributed architecture. Examples of the mobile computing device 108 include a laptop computer, a tablet computer, and a mobile phone. It should be appreciated, however, that the techniques of the present disclosure could also be applied to other computing devices, such as a desktop computer. The server 104 and the mobile computing device 108 can communicate with each other via a network 112. The network 112 can be a local area network (LAN), a wide area network (WAN), e.g., the Internet, or a combination thereof. The mobile computing device 108 can be associated with a user 116. The user 116 can operate the mobile computing device 108 including providing speech and physical (e.g., touch) input and receiving visual and/or audio output. Example components of the mobile computing device, therefore, can include a touch-sensitive display and a microphone, which are discussed in greater detail below.

Referring now to FIG. 2, a functional block diagram of the example mobile computing device 108 is illustrated. As previously mentioned, non-limiting examples of the mobile computing device 108 include tablet computers and mobile phones. The mobile computing device 108 can include a communication device 200, a processor 204, and a memory 208. The communication device 200 can be any suitable device, such as a transceiver, that is configured for communication with the server 104 via the network 112. The memory 208 can be any suitable storage medium (flash, hard disk, etc.) that is configured to store information at the server 104. For example, the memory 208 may be a non-transitory computer-readable medium configured to store a set of instructions stored thereon for execution by the processor 204. The user 116 can provide input and receive output via a user interface 212. Example components of the user interface 212 include a display 216 (e.g., a touch-sensitive display) and a microphone 220. The user interface 212 can also include other components (e.g., physical buttons).

For a touch-sensitive configuration of the display 216, the user 116 can provide touch input, such as a selection of the single word in the source language. Other touch inputs may include navigating through the displayed lexicon data for the translated word, as well as initiating a listening mode during which speech input is captured by the microphone 220. The term "processor" as used herein can refer to both a single processor and a plurality of processors operating in a parallel or distributed architecture. The processor 204 can be configured to control operation of the server 104, including executing/loading an operating system of the server 104 and operating the communication device 200, the memory 208, and the user interface 212. The processor 204 can also be configured to perform at least a portion of the techniques of the present disclosure, which are discussed in greater detail below.

The user 116 can initially provide a speech input. This speech input may be provided during a default or native state of the mobile computing device 108. Rather, the speech input may not be provided via a specific translation application of the mobile computing device 108. In some implementations, a listening mode can be initiated in response to a user touch input, such as by selecting a microphone icon. The speech input can then be captured by the microphone 220 during the listening mode. The listening mode can also be used to detect a language of the speech input; however, the source language may also be preselected by the user 116. In one implementation, the speech input includes only a single word in the source language. In another implementation, the speech input includes a plurality of words (e.g., a sentence or phrase), and the user 116 can then provide a touch input to select a single word from the plurality of words. Thus, the user 116 is able to obtain the lexicon data with either no further interaction after the speech input or, alternatively, via only a single click after the speech input.

In response to receiving the speech input and, more particularly, in response to obtaining the single word in the source language, the mobile computing device 108 can perform a plurality of actions. The plurality of actions can be performed without any further user interaction. In other words, aside from (optionally) initiating the listening mode and providing the speech input, the user 116 may not be required to provide any further input in order to obtain the lexicon data for the translated word. A first of the plurality of actions can be to identify the source language (e.g., English) and a target language (e.g., Spanish). As previously mentioned, the source language can be detected and the target language can be preselected by the user 116 or selected based on their preferences (e.g., from a plurality of associated languages). In the following example, the user 116 is an English speaking user that desires lexicon data for the translation of the English word "bear" to Spanish.

As shown in an example user interface 300 of FIG. 3, the source and target languages may be displayed via language indicators 304a (English), 304b (español) proximate to a microphone icon 308. Another of the plurality of actions can include obtaining one or more potential translations of the single word from the source language to the target language. These one or more potential translations can also be referred to as different meanings in the target language of the single word in the source language. This translation task can occur locally, at the server 104, or a combination thereof. In one implementation, the single source word 312 in the source language can be displayed in a first/upper region 316a of the user interface 300, whereas the translated word(s) 320 and the lexicon data can be displayed in a second/lower region 316b of the user interface 300. By blending the speech input and translation-specific lexicon data interfaces together, the user 116 is provided with an improved interface for quickly and efficiently ascertaining the meanings of translated words.

The plurality of actions can also include obtaining and displaying lexicon data for a particular translated word. For example, a most-likely translated word may be selected and lexicon data obtained for the most-likely translated word. As shown in FIG. 3, a most-likely Spanish translation 320 for the English single source word bear is soportar. The lexicon data can include the part-of-speech indicator 324 (verb), the related source language words indicator 328 for source words (bear, endure, hold up) having a similar semantic meaning as a particular translated word, an example sentence indicator 332 (I bear the pain), and a translated example sentence indicator 336 (Yo soporto el dolor). Lexicon data can also be obtained and displayed for other potential translations of the single word in the source language (resistir, aguantar). In some implementations, an icon 340 can be selected to obtain further information, such as separate list of websites (not shown) relating to a particular translated word.

In another implementation, there may be too many potential translations to display, along with the lexicon data, in the second/lower region 316b of the user interface 300. In these scenarios, a subset of the potential translations may be displayed without their corresponding lexicon data. For example, only the most-likely translation may be displayed. The user 116 may then select the icon 340 to display the lexicon data for the displayed potential translation. If the user 116 desires lexicon data corresponding to another potential translation that is not displayed, the user 116 may select another icon to display and select one of the other potential translations in order to obtain its corresponding lexicon data. For example only, this other icon (not shown) may be a downward-facing arrow below the most-likely translation 320 (soportar) and may indicate a quantity of other potential translations (e.g., "12 More"). Selecting this icon, for example, could then display the list of potential translations and lexicon data as shown in FIG. 3.

Figure 4:
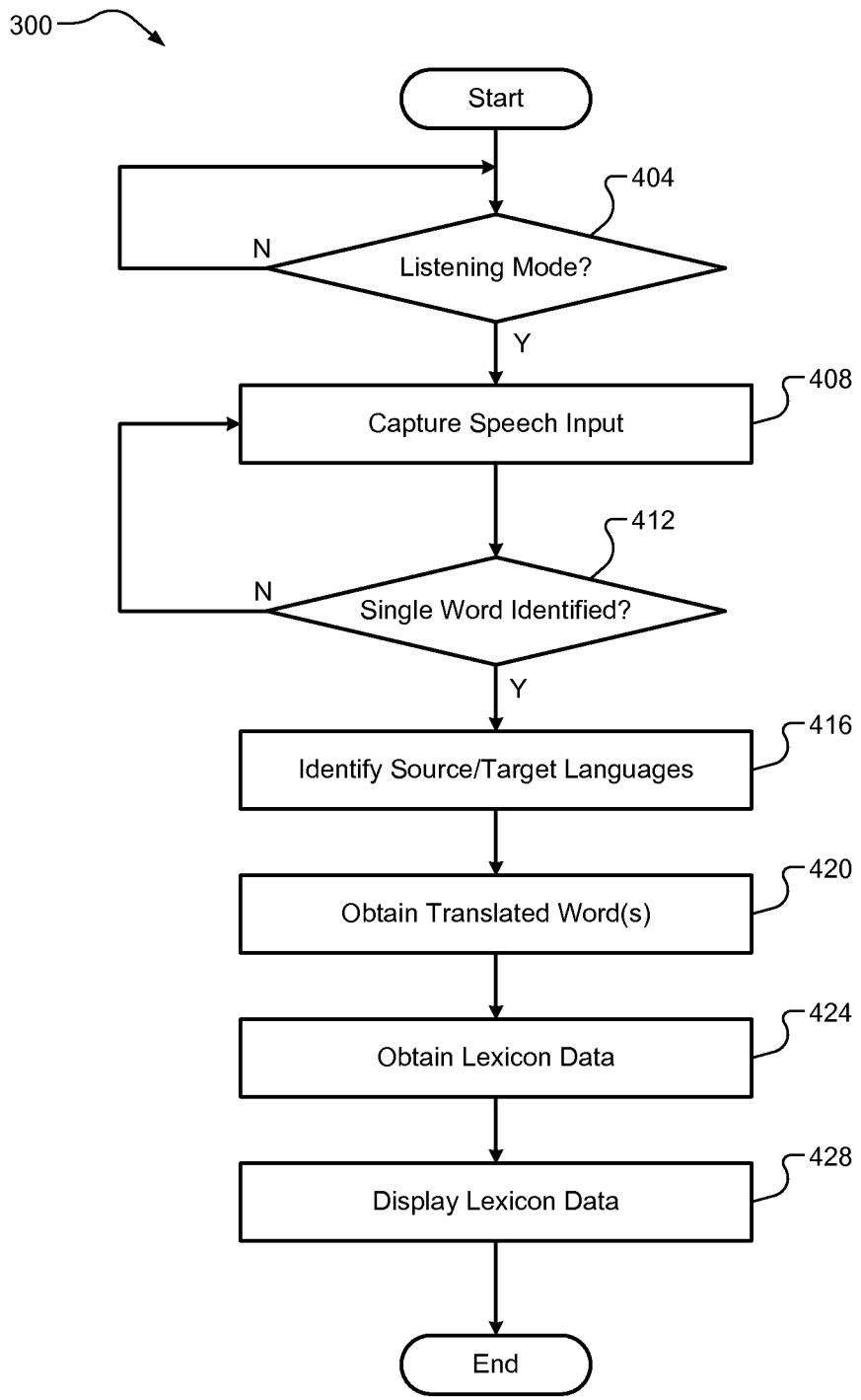
FIG. 4 is a flow diagram of an example technique for providing lexicon data for translation of a single word speech input according to some implementations of the present disclosure.

Referring now to FIG. 4, an example technique 300 for providing lexicon data for a translation of a single word in a source language is illustrated. At 304, the mobile computing device 108 can optionally determine whether a listening mode is initiated, such as in response to a user touch input (e.g., selection of the microphone icon 308). If true, the technique 400 can proceed to 408. Otherwise, the technique 400 can end or return to 404. At 408, the mobile computing device 108 can capture, using the microphone 220, a speech input from a user 116 during the listening mode. At 412, the mobile computing device 108 can determine whether the single word in the source language has been identified. For example, the speech input may include only the single source word and the listening mode may then be terminated. Alternatively, for example, the speech input may include a plurality of words in the source language and, after termination of the listening mode, the user 116 may provide a touch input to select one of the plurality of words to obtain the single word in the source language. In response to identifying the single word, the technique 400 can proceed to 416. Otherwise, the technique 400 can end or return to 412.

At 416-428, the mobile computing device 108 can perform a plurality of actions without any further user interaction. At 416, the mobile computing device 108 can identify the source language of the single word and a target language that is associated with the user 116. One or both of these languages can be preselected by the user 116 or detected (e.g., by the speech input of based on the user's preferences). At 420, the mobile computing device 108 can obtain one or more translated words that are each a potential translation of the single word to the target language. This translation can occur locally, remotely at the server 104, or some combination thereof. At 424, the mobile computing device 108 can obtain lexicon data for the one or more translated words. This lexicon data obtaining can also occur locally, remotely at the server 104, or some combination thereof. For example, obtaining the lexicon data may be a more complex task than the translation of the single source word, and thus this may be a more suitable task to be performed, at least partially, at the server 104. At 428, the mobile computing device 108 can display (e.g., at display 216) the lexicon data. The technique 400 can then end or return to 404 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   capturing, by a microphone associated with a computing device, a speech input from a user; and
   in response to capturing the speech input and without any additional input from the user, performing a plurality of actions comprising:
      obtaining, by the computing device, potential transcriptions of the speech input, each potential transcription being a word in the source language;
      obtaining, by the computing device, potential translations of each word from the source language to a different target language; and
      obtaining, by the computing device, lexicon data for each potential translation, each lexicon data being information relating to at least one semantic meaning of its associated potential translation.

2. The computer-implemented method of claim 1, wherein the plurality of actions further comprise obtaining, by the computing device, a most-likely word in the source language by determining a most-likely potential transcription.

3. The computer-implemented method of claim 2, wherein the plurality of actions further comprise displaying, by the computing device, the most-likely word in the source language.

4. The computer-implemented method of claim 3, wherein the plurality of actions further comprise obtaining, by the computing device, a most-likely word in the target language by determining a most-likely potential translation.

5. The computer-implemented method of claim 4, wherein the plurality of actions further comprise displaying, by the computing device, the most-likely word in the target language.

6. The computer-implemented method of claim 5, further comprising displaying, by the computing device, a first selectable icon configured to control displaying of the lexicon data by the computing device.

7. The computer-implemented method of claim 6, further comprising:
   receiving, by the computing device and from the user, a selection of the first selectable icon; and
   in response to receiving the selection, displaying, by the computing device, at least a portion of the lexicon data.

8. The computer-implemented method of claim 7, further comprising displaying, by the computing device, a second selectable icon configured to switch from the most-likely word in the target language to another word in the target language that is another potential translation.

9. The computer-implemented method of claim 8, further comprising:
   receiving, by the computing device and from the user, a selection of the second selectable icon; and
   in response to receiving the selection, modifying, by the computing device, the displaying of at least the portion of the lexicon data.

10. The computer-implemented method of claim 1, further comprising operating, by the computing device, in a default or native state during the capturing.

11. A computing device, comprising:
    a touch-sensitive display;
    a memory storing a set of instructions; and
    one or more processors configured to execute the set of instructions, which causes the computing device to perform operations comprising:
       capturing, by a microphone associated with the computing device, a speech input from a user;
       obtaining a plurality of words from the speech input, each word being in a source language;
       displaying, by the touch-sensitive display, the plurality of words;
       receiving, by the touch-sensitive display and from the user, a first touch input indicative of a selection of a particular word of the plurality of words; and
       in response to receiving the first touch input and without any additional input from the user, performing a plurality of actions comprising:
          obtaining potential translations of the particular word from the source language to a different target language; and
          obtaining lexicon data for each potential translation, each lexicon data being information relating to at least one semantic meaning of its associated potential translation.

12. The computing device of claim 11, wherein obtaining the potential translations comprises generating probability scores each being indicative of a likelihood that a particular potential translation is an appropriate translation of the particular word from the source language to the target language.

13. The computing device of claim 12, wherein the plurality of actions further comprise obtaining a most-likely word in the target language by selecting the potential translation having the highest relative probability score.

14. The computing device of claim 13, wherein the plurality of actions further comprise displaying, by the touch-sensitive display, the most-likely word in the target language.

15. The computing device of claim 14, wherein the operations further comprise displaying, by the touch-sensitive display, a first selectable icon configured to control displaying of the lexicon data by the touch-sensitive display.

16. The computing device of claim 15, wherein the operations further comprise:
    receiving, by the touch-sensitive display and from the user, a second touch input indicative of selection of the first selectable icon; and
    in response to receiving the selection, displaying, by the touch-sensitive display, at least a portion of the lexicon data.

17. The computing device of claim 16, wherein the operations further comprise displaying, by the touch-sensitive display, a second selectable icon configured to switch from the most-likely word in the target language to another word in the target language that is another potential translation.

18. The computing device of claim 17, wherein the operations further comprise:
   receiving, by the touch-sensitive display and from the user, a third touch input indicative of a selection of the second selectable icon; and
   in response to receiving the selection, modifying the displaying, by the touch-sensitive display, of at least the portion of the lexicon data.

19. The computing device of claim 11, wherein the operations further comprise:
   obtaining a plurality of potential transcriptions of the speech input, each potential transcription comprising a set of words; and
   obtaining the plurality of words by selecting a most-likely one of the sets of words.

20. The computing device of claim 11, wherein the operations further comprise operating in a default or native state during the capturing.

* * * * *